July 31, 1923.

A. STUCKI

ROLLER SIDE BEARING

Filed June 15, 1922

1,463,602

2 Sheets-Sheet 1

WITNESSES
J. Herbert Bradley
C. R. Halbert

INVENTOR
Arnold Stucki
By Winter & Brown
His Attys.

July 31, 1923.

A. STUCKI 1,463,602

ROLLER SIDE BEARING

Filed June 15, 1922

2 Sheets-Sheet 2

WITNESSES
J. Herbert Bradley.
CR Halbert

INVENTOR
Arnold Stucki
By Winter & Brown
His Attys.

Patented July 31, 1923.

1,463,602

UNITED STATES PATENT OFFICE.

ARNOLD STUCKI, OF PITTSBURGH, PENNSYLVANIA.

ROLLER SIDE BEARING.

Application filed June 15, 1922. Serial No. 568,439.

*To all whom it may concern:*

Be it known that I, ARNOLD STUCKI, a citizen of the United States, and a resident of Pittsburgh, in the county of Allegheny and State of Pennsylvania, have invented a new and useful Improvement in Roller Side Bearings, of which the following is a specification.

This invention relates to roller side bearings for railway cars, and particularly to a side bearing adapted to be attached to the truck, and cooperating with an upper bearing plate attached to the car body.

It is an object of the invention to provide a bearing of this type which is self-centering, which is simple in construction, efficient in operation, economical to manufacture, which is self-cleaning under normal operating conditions, and which is void of all special mechanism such as gears or teeth, together with cooperating recesses and the like.

It is a special object of the invention to provide a bearing composed of a minimum number of parts which can be easily assembled and disassembled and one in which the roller is not only centered but will be retained in its centered position while out of contact with the upper bearing plates regardless of extraneous forces caused by the movement of the car, without detracting from the effectiveness of the bearing whenever the upper bearing plate contacts the roller.

Another special object of the invention is to provide a bearing in which the roller is normally centered under the influence of a tension spring while out of contact with the upper bearing plate but adapted to yield and permit the usual functioning of the bearing during contact of the upper bearing plate therewith.

It is also a special object to provide a bearing comprising a tension device removably attached to the roller, the tension device and roller forming however a unit which may be inserted and removed from the cage or housing as an entirety, the relation of the parts being such as not to detract in any way from the effective cooperation of the roller with the bearing surfaces thus interfering with the effective operation of the bearing.

It is still a further special object of the invention to so combine and proportion the several parts that the roller will be properly disposed upon the lower bearing plate to secure the most effective operation regardless of its longitudinal position in the housing or cage.

Figure 1:
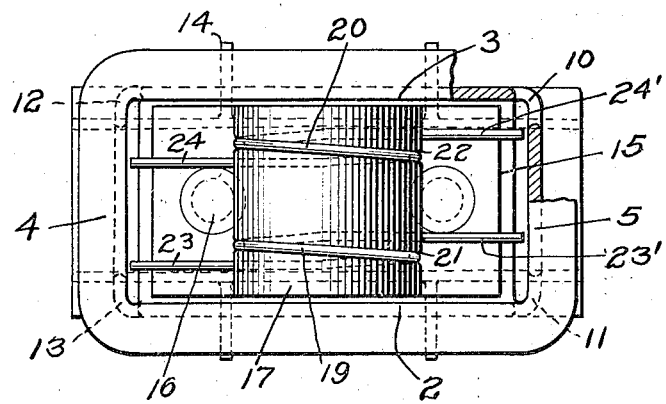
Figure 2:
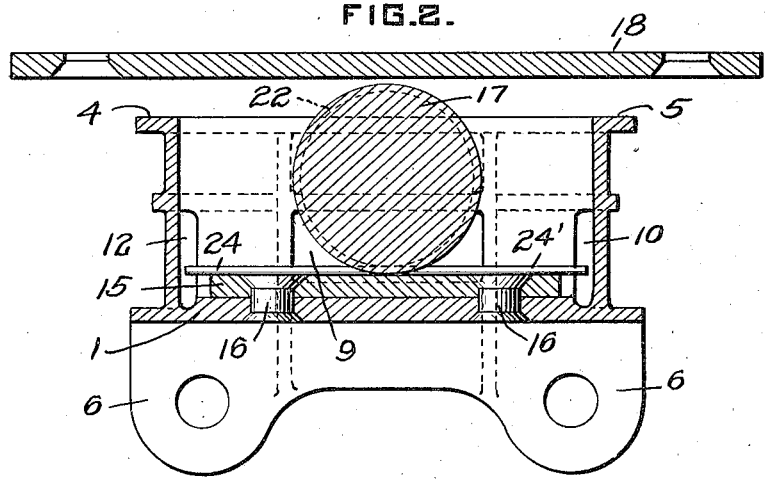
Figure 3:
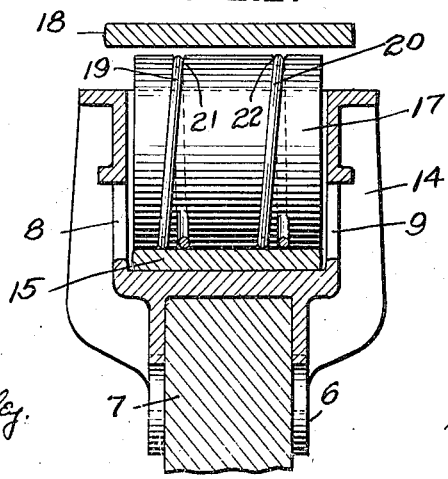
Figure 4:
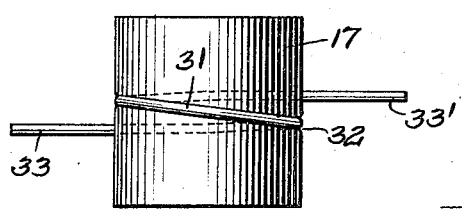
Figure 5:
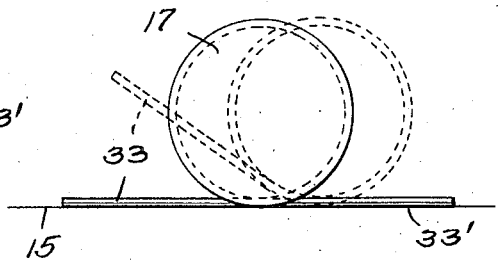
Figure 6:
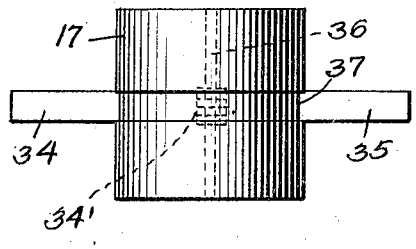
Figure 7:
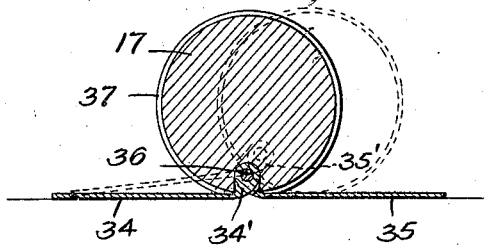
Figure 8:
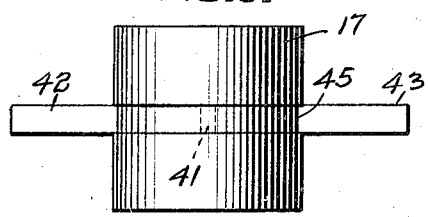
Figure 9:
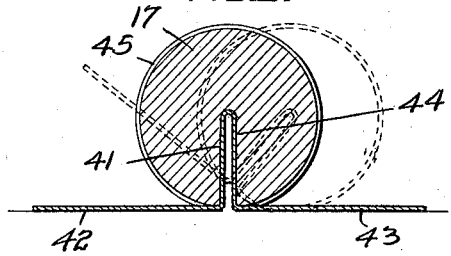
Figure 10:
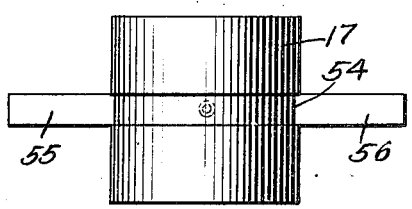
Figure 11:
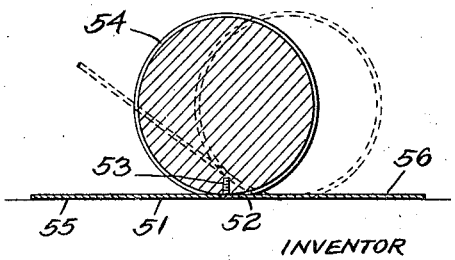

In the accompanying drawings, Fig. 1 is a plan view of the preferred embodiment of the invention; Fig. 2 a longitudinal sectional view of the form illustrated in Fig. 1; Fig. 3 a view similar to Fig. 2 taken in a plane at right angles to that of said figure; Fig. 4 a detailed plan view of the associated roller and tension device of a modified construction similar to that employed in the preferred form comprising but a single tension element; Fig. 5 an elevational view of the parts shown in Fig. 4 illustrating the relative positions assumed by the parts during the longitudinal movement of the roller upon the lower bearing surface; Figs. 6, 8 and 10 are views similar to Fig. 4 illustrating additional modifications of the invention; and Figs. 7, 9 and 11 are detailed sectional views illustrating the relative positions assumed by the parts during operation in analogous manner to that illustrated by Fig. 5.

The bearing comprises a cage or housing having a bottom 1, side walls, 2, 3 and end walls 4, 5, and depending from the bottom of the housing are ears or lugs 6 provided with apertures for receiving bolts or rivets connecting the bearing to the member 7 of the truck. Side walls 2 and 3 are provided with openings 8 and 9, respectively, and the corners of the housing with the openings 10, 11, 12, and 13, all of said openings being positioned near the lower portion of the housing so as to render the bearing self-cleaning. The housing is also equipped with the strengthening ribs 14.

Preferably superposed upon the bottom 1 of the housing is a lower bearing plate 15, attached to the bottom in any suitable manner, as by riveting, indicated at 16. Disposed within the housing and resting upon the lower bearing plate 15 is the cylindrical roller 17 which is adapted to be contacted by the upper bearing plate 18 attached to the car body.

In the preferred construction, the roller 17 is provided with a plurality of spaced peripheral spiral grooves 19 and 20, these grooves extending slightly more than a complete turn around the body of the roller so that the extremities thereof extend to either side of the point of contact of the roller with the bearing plate 15 when in its centered position. Tension devices formed of springs having their intermediate portions bent to form a complete convolution of a spiral engage the roller 17, the convolutions of the intermediate portions encircling the roller and fitting within the grooves 19 and 20. The intermediate convolutions of the tension members in the preferred form are indicated at 21 and 22, and the cooperation between the same and the roller is clearly illustrated in Figs. 1 to 3. Extending in either direction from the convolution 21 are the extremities 23 and 23', and similarly extending from the convolution 22 are the extremities 24 and 24', all of which terminate in close proximity to the end walls of the housing.

In the form illustrated in Fig. 4, but a single tension spring similar to that disclosed in the preferred form, encircles the roller 17, in which instance the intermediate convolution 31 engages and rests within a spiral groove 32 located substantially midway between the ends of the roller, the extremities 33 and 33' extending therefrom in a manner similar to that described above.

In the modification illustrated in Figs. 6 and 7, instead of a tension spring provided with an intermediate convolution which encircles and embraces the periphery of the roller, a pair of spring plates 34 and 35 are employed, having inner perforated extremities 34' and 35' pivoted within a recess in the body of the roller by means of a pin 36. The roller is peripherally grooved at 37, the depth of the groove corresponding to the thickness of the spring plates 34 and 35 so as to permit the entire width of the roller to firmly contact the lower bearing plate during rolling movement of the roller thereon.

In the modification shown in Figs. 8 and 9, a single tension spring is employed having its intermediate portion 41 U-shaped and bent upon itself with the extremities 42 and 43 extending in opposite directions therefrom. The tension member in this form is attached to the roller by inserting the U-shaped intermediate portion 41 within a radial slot 44 provided in the body of the roller for such purpose, the periphery of the roller having a peripheral groove 45 for the reception of the ends 42 and 43 during the rolling movement of the roller 17, similar to the modified form just previously described.

In the modified form shown in Figs. 10 and 11, a tension device formed of a straight spring plate 51 is employed. The spring plate 51 is provided with a countersunk aperture 52 midway between its ends through which the screw bolt 53 extends, being threaded into the body of the roller. The body of the roller in this form is also provided with a peripheral groove 54 for the reception of the ends 55 and 56 of the spring plate.

In each of the forms described, the tension member is removably attached to the roller 17 but forms a unit therewith which may be readily inserted or removed from the cage or housing as an entirety, and in each form the tension member cooperates with a grooved portion of the roller so as to insure operative contact between the entire width of the body of the roller and the lower bearing plate. Although the spiral grooves in the preferred form illustrated in Figs. 1 to 3, also the spiral grooves in the form shown in Figs. 4 and 5, have been described as extending but slightly more than a complete turn around the body of the roller, it is obvious that the length of said grooves may be increased, if desired, so as to permit the turning of the roller within the intermediate convolution of the spring to bring new portions of the roller into contact with the bearing plate while in its centered position, thus increasing the effective life thereof. It is also obvious that while the preferred method of accommodating the tension springs during rolling movement of the roller to permit the entire width of the roller contacting the bearing surface, is to provide peripheral grooves in the body thereof, a similar effect may be secured by providing depressions or grooves in the bearing plates to receive the spring ends.

The operation of the device is as follows. Whenever the roller 17 is out of contact with the upper bearing plate 18, the roller is centered on the lower bearing plate 15 by the tension members due to the positions normally assumed thereby, and will be retained in such centered position regardless of extraneous forces due to the motion of the car. Whenever the car body sways sufficiently to bring the upper bearing plate 18 into contact with the roller, any subsequent swiveling movement of the truck will cause the roller to travel toward the end walls of the housing, flexing the spring members and placing the same under tension. As long as the upper bearing plate 18 remains in contact with the roller, the spring members will be kept under tension, but as soon as the body lifts sufficiently to break contact between the bearing plate 18 and the roller 17, the tension members will immediately assume their original position, returning the roller to its centered position, ready to be again contacted by the upper bearing plate upon subsequent swiveling of the truck.

During rolling movement of the roller, in the forms illustrated in Figs. 1 to 5, one extremity of the spring will be flexed, the remaining extremity assuming a raised position to compensate for the movement of the several parts. The relative positions which the parts assume during the rolling movement of the roller are clearly illustrated by the dotted lines in Fig. 5.

During rolling movement of the roller in the modification illustrated in Figs. 6 and 7, either the spring plate 34 or 35 will be flexed and placed under tension, while the remaining one due to its pivotal connection with the body of the roller will simply remain inert, its relative position with the remaining parts during such movement being shown by the dotted lines in Fig. 7.

In the modified form shown in Figs. 8 to 11 one extremity of the device will be placed under tension in a manner similar to that described in connection with the forms illustrated in Figs. 1 to 5, the relative positions of the parts during such rolling action being clearly illustrated by the dotted lines shown in said figures.

The extremities of the several springs are of such length as to extend into close proximity to the end walls of the housing so as to prevent the roller shifting from its centered position while out of contact with the upper bearing plate. The preferred form, in which a pair of spaced springs are employed, is particularly effective for this purpose, and besides any tendency of the roller to become askew results in contacting one of the spring extremities with the end wall adjacent thereto, thus assuring proper positioning of the roller at all times.

It is thus seen that the invention provides a simple, compact, efficient and economical bearing for the purpose intended, one comprising a minimum number of parts in which the same may be readily assembled and disassembled, one in which the roller is effectively centered and maintained in its centered position regardless of extraneous forces resulting from the movement of the car, one in which the roller and the tension device for centering the same may be inserted and removed from the housing or cage as a unit, and one in which the cooperation between the several parts serves to constantly maintain the roller in its properly aligned position during operation.

I claim:

1. A side bearing for railway cars comprising a housing having its bottom forming a bearing surface and provided with side and end walls, a roller in the housing resting on the bearing surface, a spring normally retaining the roller in centered position attached to the roller, the spring and roller forming a detached unit freely insertable and removable from the housing, the free detached ends of the spring contacting the bearing surface throughout a substantial extent and adapted to be flexed whereby to place the same under tension upon movement of the roller towards the said end walls.

2. A side bearing for railway cars comprising a housing having its bottom forming a bearing surface and provided with side and end walls, a roller in the housing resting on the bearing surface, the roller being provided with a peripheral groove, a spring normally retaining the roller in centered position attached to the roller engaging the groove and adapted to rest within the groove during movement of the roller, portions of the spring abutting the bearing surface and adapted to be flexed whereby to place the same under tension upon movement of the roller towards the ends of the housing.

3. A side bearing for railway cars comprising a housing having its bottom forming a bearing surface and provided with side and end walls, a roller in the housing resting on the bearing surface, the roller being provided with a peripheral groove, a spring normally retaining the roller in centered position, said spring being coiled at its intermediate portion fitting in the groove and encircling the roller, the extremities of the spring abutting the bearing surface and adapted to be flexed whereby to place the same under tension upon movement of the roller towards the ends of the housing.

4. A side bearing for railway cars comprising a housing having its bottom forming a bearing surface and provided with side and end walls, a roller in the housing resting on the bearing surface, the roller being provided with spaced peripheral grooves, springs attached to the roller and fitting in the grooves for normally retaining the same in centered position, intermediate portions of the springs being coiled and encircling the roller, the extremities of the springs resting upon the bearing surface and adapted to be flexed whereby to place the springs under tension upon movement of the roller towards the end walls of the housing, the length of the springs being such as to extend into close proximity to said end walls.

In testimony whereof, I sign my name.

ARNOLD STUCKI.

Witness:
EDWIN O. JOHNS.